United States Patent [19]
Wykes et al.

[11] Patent Number: 5,526,840
[45] Date of Patent: Jun. 18, 1996

[54] EMERGENCY DUMP TANK FOR CONGEALABLE MATERIALS

[75] Inventors: Katharine A. Wykes, Wellesbourne; Michael C. Quigley, Meriden, both of United Kingdom

[73] Assignee: Courtaulds Fibres (Holdings) Limited, London, England

[21] Appl. No.: 66,999

[22] Filed: May 24, 1993

[51] Int. Cl.[6] .................................................. F17D 1/16
[52] U.S. Cl. ............................................. 137/14; 137/587
[58] Field of Search .................................. 137/584, 587, 137/13, 14

[56] References Cited

U.S. PATENT DOCUMENTS

| | | | |
|---|---|---|---|
| 2,648,774 | 8/1953 | Whitlock | 137/587 |
| 2,706,999 | 4/1955 | Pickard | 137/584 |
| 5,251,658 | 10/1993 | Zink | 137/587 |
| 5,354,371 | 10/1994 | Wykes et al. | 106/198 |

FOREIGN PATENT DOCUMENTS 1800061  4/1970  United Kingdom .

*Primary Examiner*—A. Michael Chambers
*Attorney, Agent, or Firm*—Fish & Richardson

[57] ABSTRACT

A dump tank for receiving congealable material vented from a chemical process, the dump tank having two access doors covering two access ports, both doors being openable for cleaning purposes so that congealable material vented into the tank can be pushed out of one access port from the other port.

4 Claims, 1 Drawing Sheet

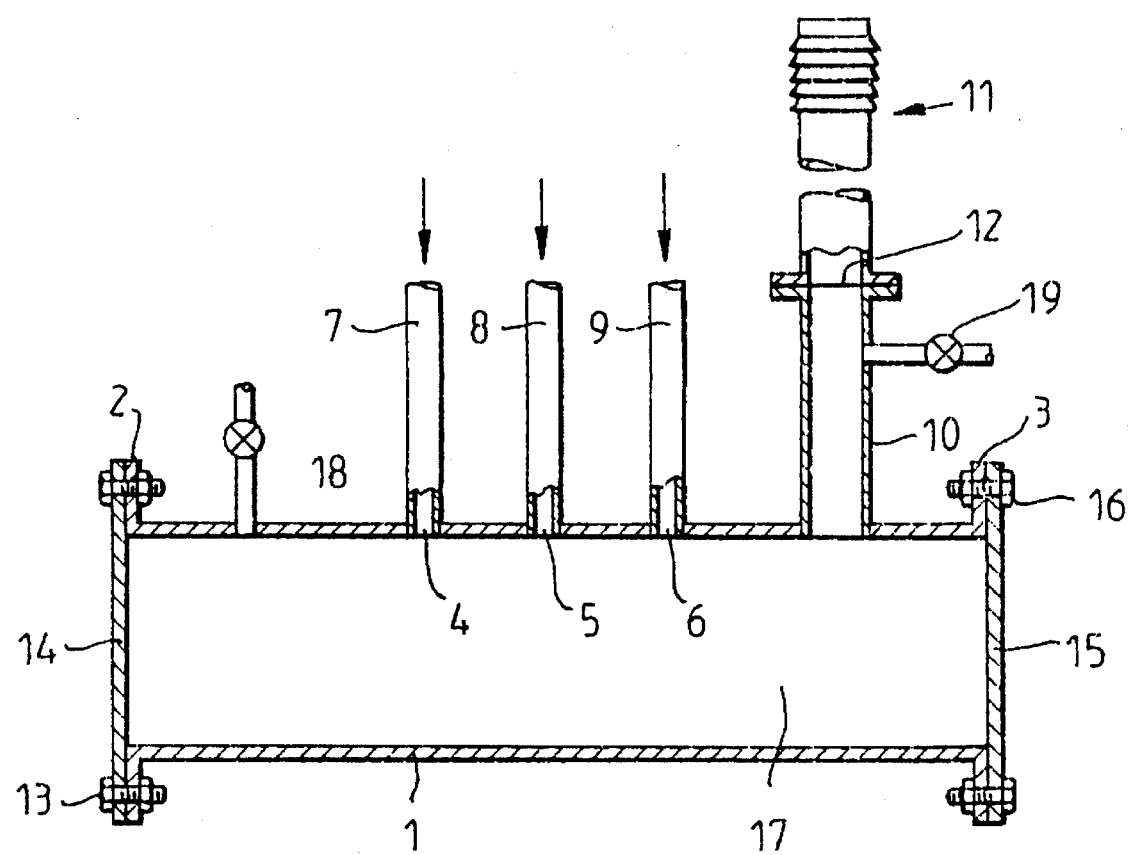

1

EMERGENCY DUMP TANK FOR CONGEALABLE MATERIALS

BACKGROUND OF THE INVENTION

1. Field of the Invention

This invention relates to dump tanks and has particular reference to emergency dump tanks for the retention of congealable materials.

The invention has further particular, but not necessarily exclusive, reference to dump tanks for use in the containment of solutions of cellulose in aqueous organic compounds—typically n-methyl morpholine n-oxide.

Cellulosic fibres have attractive absorbency and comfort characteristics and are widely used in the production of products such as garments and absorbency products. Certain cellulosic fibres occur in nature—such as cotton. Other cellulosic fibres are produced by the formation of a chemical compound of cellulose to produce a spinnable solution which is extruded or spun into a regeneration bath to form the fibres. Viscose rayon is an example of such a fibre.

More recently techniques have been developed for the production of cellulosic fibres by the dissolution of cellulose in an aqueous organic solvent for cellulose. Such fibres have been given the generic term "lyocell fibres".

A preferred solvent for cellulose is a tertiary amine oxide, in particular n-methyl morpholine n-oxide.

Although cellulose can form a stable solution in an aqueous n-methyl morpholine solvent, the solution can exotherm if the temperature of the solution rises above a predetermined level. Once under way, an exotherm comprises an uncontrollable chemical reaction characterised by the release of excessive quantities of energy in a very short period of time. Because the solution of cellulose in aqueous n-methyl morpholine n-oxide (NMMO) is relatively viscous—although thixotropic—one of the characteristics of an exotherm is the displacement of solution as a result of the formation of gases in the exotherm. Unstabilised solutions gradually degrade, in doing so they emit heat. This can cause a runaway reaction once the temperature of the solution reaches about 170° C. Stabilised solutions using stabilisers such as propyl gallate reach runaway reactions temperatures at about 180° C.

Proposals have been made, therefore, to provide safety relief devices to relieve pressure and material in the event of an exotherm. Such a device is described in copending application Ser. No. 08/066,532 filed on May 24, 1993 the contents of which are incorporated herein by way of reference, and which is based on the priority of UK Patent Application No. 9220407.2 originally filed in the United Kingdom on Sep. 28, 1992.

The present invention is concerned with an emergency dump tank for the retention of congealable material produced, in a particular example, by an exotherm occurring in a pipeline containing a solution of cellulose in an aqueous NMMO solution.

By congealable material as used herein is meant a material which increases significantly in viscosity or cooling or coming to rest, forming for example a solid or a rubbery mass of material or a material of too high a viscosity to flow or be pumped.

SUMMARY OF THE INVENTION

By the present invention there is provided an emergency dump tank for the retention of a congealable material, said tank having defining walls and at least one entry line for said material and a vapour vent line, said vent line being connected to a vapour exit port located in the upper region of said dump tank and having a vent exit open to the atmosphere, a seal to prevent the atmosphere entering said tank via said vapour vent line during non-emergency rest conditions of said tank, said seal being openable under the action of pressure in said dump tank so as to permit said vapour exit to be in gaseous communication with said surrounding atmosphere, an inert atmosphere being maintained in said tank in use, there being at least two openable access ports in said walls so as to permit congealable material in said tank to be removed from said tank by opening both of said access ports so that material can be pushed out of one of said ports via the other of said ports.

The inert atmosphere may be nitrogen.

The vent line may be disposed in a substantially vertical line out of the tank. The vent line may be heated so as to be maintained at a temperature in excess of 100° C., preferably 100°–125° C.

The present invention also provides a dump tank for the reception of a congealable material vented from a chemical process, in which the tank includes at least one entry line for the entry of congealable material into said tank and a pair of access ports openable in said tank to permit removal of congealable material from said tank by opening both of said access ports and pushing congealable material from one of said ports through the other of said ports.

The dump tank may be in the form of a cylinder, having flanges at both ends, the access ports being formed by blanking plates bolted or otherwise secured to said flanges.

The present invention yet further provides a process for safely venting a solution of cellulose in an aqueous n-methyl morpholine n-oxide solvent from a pipeline following an exotherm of said solution, which process includes the steps of:

(i) transporting said solution via a heated dump line to a dump tank, (ii) said dump tank having an entry port for said dump line, a vapour exit port communicating to atmosphere and at least two access ports having openable access doors, (iii) permitting at least partial cooling and congealing of said solution in said dump tank, (iv) opening both of said access doors to permit access to said dump tank, (v) pushing said at least partially congealable solution out of one of said access ports by pushing on said at least partially congealable solution from the other of said access ports.

BRIEF DESCRIPTION OF THE DRAWINGS

By way of example, embodiments of the present invention will now be described with reference to the accompanying drawing, which is a cross section of an emergency dump tank.

DESCRIPTION OF THE PREFERRED EMBODIMENT

The dump tank illustrated in the drawing comprises a mild steel cylinder 1 having flanges 2,3 at either end. Along the length of the cylinder there are a series of ports 4,5 and 6 in communication with entry lines 7, 8 and 9. A vapour vent line 10 is in communication with a chimney stack indicated generally by 11. A thin membrane 12 is located across the vapour vent line 10.

Bolted to the flange 2 by means of bolts 13 is an access door 14. Similarly an access door 15 is bolted by means of bolts 16 to flange 3.

In use the vent tank is filled with nitrogen at a pressure of 1–3 psig. The emergency vent tank would normally be located conveniently within a chemical plant so that the entry lines 7, 8 and 9 are simply in communication with whatever source of congealable material may be required to be forced in an emergency into the dump tank. Typically the lines 7, 8 and 9 are in communication with the pressure relief device described in our copending application Ser. No. 08/066,532 filed on May 24, 1993 corresponding to the UK Patent Application No. 9220407.2, referred to above.

A typical chemical plant would be one handling a solution of cellulose in an aqueous NMMO solvent. The solution would be piped in pipelines at about 100° C. to 115° C., but if the solution experiences a higher temperature, say 135° C. for a sufficiently long time, say one hour, an uncontrollable reaction or exotherm can occur with the release of a considerable amount of gases and energy in the form of heat.

In the event of an exotherm, the solution of cellulose in the aqueous NMMO would be forced through one of the entry lines 7, 8 or 9 which are heated to 100° C. and through the ports 4, 5 and 6 into the chamber 17 which is defined by the walls of the dump tank. It has been found to be safest to heat the lines, otherwise if small quantities of solution weep into the lines—for example from a leak in the bursting disc, this can congeal without any indication of a problem, and then block the entry line. Preferably the entry lines are heated to 90° to 120° C. preferably 100° to 115° C.

The entry of material into the tank will give rise to a sudden increase in pressure within the dump tank thus bursting the membrane 12 and permitting excess nitrogen and vapour to be vented to atmosphere through the chimney stack 11. A bursting disc rupture detection device can be used to detect the rupture of the disc. Alternatively, the pressure in the tank can be monitored and the loss of pressure occurring following bursting of the membrane 12 can be used to indicate a flow of material into the dump tank. The vent line from the vent tank is provided with a heater, either electrical or hot water, to keep its temperature at about 100° C. The purpose for this is to ensure that there is a free path at all times for the dope to vent with the gasses. One some occasions there may be a secondary exotherm after the first exotherm. The second exotherm may take place a number of hours after the first and so it is important that the vent lines are kept hot to prevent material from the 1st exotherm cooling and solidifying. As yet we are not aware of a tertiary exotherm occurring. It is also important that the electrical tracing is rated at least 450° C. otherwise the tracing can fail. The vent line must also fall to the vent pot to ensure that there are no dope traps. If required scrubber or absorber means can be provided in the chimney 11 to absorb any unwanted vapours. Typically the scrubber means may comprise activated charcoal.

The membrane 12 is preferably in the form of a thin bursting disc having a low bursting pressure—typically 5 psig.

After an emergency venting has occurred the chamber 17 will be partially full of the solution of cellulose in NMMO. Because such a material congeals as the temperature falls, a rubbery plug of material will be formed in the chamber 17.

To remove the congealed material, air can be flushed through the tank and then the bolts 2 and 16 are undone so as to permit the access doors 14 and 15 to be removed. The congealed material can then be pushed out from the chamber 17 through one aperture at one end by pushing the material from the other end.

This means that the congealed material can be simply and rapidly removed from the emergency dump tank so as to permit a rapid readying of the dump tank for further use as required. Clearly, the less such a dump tank is used the better, however, in the event of its requirement to operate, it is desirable to be able to readily and rapidly empty the dump tank from congealed or partially congealed material so as to permit the dump tank to be available for further operation as required.

After the dump tank has been cleaned out, the access door 14 and 15 are rebolted into position, a new bursting disc 12 is inserted and the disc is sealed in position. A fresh charge of nitrogen is forced into the dump tank via a nitrogen inlet line 18 and out through a closable nitrogen vent valve 19 just below the disc 12. Once the system has been purged of air, the nitrogen vent valve is closed and the system is pressurised to 2 psig. The system is then ready for further use.

More than one dump tank can be provided, and the chimney stacks of the separate dump tanks can be manifolded into a single chimney to form a single vent to external atmosphere.

We claim:

1. A process for safely venting a solution of cellulose in an aqueous n-methyl morpholine n-oxide solvent from a pipeline following an exotherm of said solution, which process includes the steps of:

(i) transporting said solution via a dump line to a dump tank, (ii) said dump tank having an entry port for said dump line, a vapour exit port communicating to atmosphere and at least two access ports having openable access doors, (iii) permitting at least partial cooling and congealing of said solution in said dump tank, (iv) opening both of said access doors to permit access to said dump tank, (v) pushing said at least partially congealable solution out of one of said access ports by pushing on said at least partially congealable solution from the other of said access ports.

2. The process of claim 1 in which the tank contains an inert atmosphere.

3. The process of claim 1 in which the inert atmosphere is nitrogen.

4. The process of claim 2 in which the vapour exit port communicates to the atmosphere via a line containing a seal, said seal being openable under the influence of pressure within the dump tank.

\* \* \* \* \*

UNITED STATES PATENT AND TRADEMARK OFFICE
CERTIFICATE OF CORRECTION

PATENT NO. : 5,526,840

DATED : June 18, 1996

INVENTOR(S) : Katherine A. Wykes, Michael C. Quigley

It is certified that error appears in the above-identified patent and that said Letters Patent is hereby corrected as shown below:

Title page, Section [56] under subheading "Foreign Patent Documents", change "United Kingdom" to --Germany--.

Signed and Sealed this

Twenty-eighth Day of April, 1998

*Attest:*

BRUCE LEHMAN

*Attesting Officer*  *Commissioner of Patents and Trademarks*